United States Patent
Huettner (10) Patent No.: US 6,326,976 B1
(45) Date of Patent: Dec. 4, 2001

(54) METHOD FOR DETERMINING THE REPRESENTATION OF A PICTURE ON A DISPLAY AND METHOD FOR DETERMINING THE COLOR OF A PIXEL DISPLAYED

(76) Inventor: Tobias Huettner, Tannenstrasse 5, 71126 Gaeufelden (DE)

(*) Notice: Subject to any disclaimer, the term of this patent is extended or adjusted under 35 U.S.C. 154(b) by 0 days.

(21) Appl. No.: 09/370,350

(22) Filed: Aug. 6, 1999

(51) Int. Cl.$^7$ ............................................. G06F 15/00
(52) U.S. Cl. .................. 345/582; 345/581; 345/584; 345/587; 345/585; 345/588
(58) Field of Search ................... 345/582, 581, 345/584, 587, 585, 586, 589, 593, 588

(56) References Cited

U.S. PATENT DOCUMENTS

| | | | | |
|---|---|---|---|---|
| 5,097,427 | * | 3/1992 | Lathrop et al. | 395/130 |
| 5,579,456 | * | 11/1996 | Cosman | 395/128 |
| 5,760,783 | * | 6/1998 | Migdal et al. | 345/430 |
| 5,872,902 | * | 2/1999 | Kuchkuda et al. | 395/130 |
| 5,877,771 | * | 3/1999 | Drebin et al. | 345/430 |
| 5,987,567 | * | 11/1999 | Rivard et al. | 711/118 |
| 6,104,415 | * | 8/2000 | Gossett | 345/513 |
| 6,130,680 | * | 10/2000 | Cox et al. | 345/511 |

OTHER PUBLICATIONS

Williams, L. "Pyramidal Parametrics", *Computer Graphics*, vol. 17, No. 3, Jul. 1983; pp. 1–11.

* cited by examiner

*Primary Examiner*—Matthew Luu
*Assistant Examiner*—Daniel J Chung
(74) *Attorney, Agent, or Firm*—Quarles & Brady LLP (57) ABSTRACT

The present invention concerns a method for determining the representation of a picture on a display and a method for determining the color of a pixel displayed on a display. It is the object of the present inventions to enable computers disposing of a relatively low capacity for calculating the displayed image to fast and unaltered representations of images disposing of textures with a large size. This is achieved by altering the textures in MIPmaps and determining the MIPmap level for displaying the texture and calculating the color value of a pixel in a manner adapted to screen resolution and computing speen.

11 Claims, 9 Drawing Sheets

| M | size of W | (in bytes) | number of pointers |
|---|---|---|---|
| 8 | (MS 2x4) | 8*7*6*8=2,688 | 400 |
| 8 | (I 3x5) | 12*11*13*8=13,728 | 2,955 |
| 16 | (MS 4x4) | 12*11*14*16=29,568 | 3,136 |
| 16 | (MS 2x8) | 16*15*14*16=53,760 | 3,136 |
| 16 | (I 5x5) | 12*11*23*16=48,576 | 14,425 |
| 16 | (I 3x9) | 20*19*23*16=139,840 | 18,279 |
| 32 | (MS 2x16) | 32*31*30*32=952,320 | 30,784 |
| 32 | (MS 4x8) | 20*19*30*32=364,800 | 30,784 |
| 32 | (I 3x17) | 36*35*49*32=1,975,680 | 127,551 |
| 32 | (I 5x9) | 24*23*49*32=865,536 | 87,165 |
| 64 | (MS 8x8) | 28*27*62*64=2,999,808 | 254,080 |
| 64 | (I 9x9) | 32*31*79*64=5,015,552 | 518,481 |

METHOD FOR DETERMINING THE REPRESENTATION OF A PICTURE ON A DISPLAY AND METHOD FOR DETERMINING THE COLOR OF A PIXEL DISPLAYED

TECHNICAL FIELD

The present invention concerns a method for determining the representation of a picture on a display and a method for determining the color of a pixel displayed on a display.

BACKGROUND OF THE INVENTION

It is well known to have pixel representations of pictures having a better resolution than the display they were displayed on. Further it is well known to compute a representation from a picture according to a given viewers position and a given viewers direction in order to display an image on a screen which corresponds to the picture seen under the given conditions by a viewer.

It is a popular and well known method of picture representation to decompose it in a polygonal model. The surface of each polygon is filled by a so-called texture. The details in representation of a picture were growing with an increased amount of pixels representing such a texture. On the other side the time needed to calculate the representation of the texture on the screen increases with the amount of the pixel size of the picture. Especially when a real time representation of the picture is required huge calculation capacity and great memory storage were required to deal with big pixel sizes of the map, which is too expensive for ordinary computer users.

Texture mapping is a popular way of enhancing realism of three-dimensional scenes without increasing the polygonal complexity. Usually, system memory or memory dedicated as texture memory is restricted by technical and/or economical constraints. On specialized computers with high graphic abilities, the size of a single texture is limited to a resolution in the order of 1,024×1,024 pixels. High resolution graphics are graphics representing pictures wherein a great amount of detail has to be represented. Textures were required having a resolution of 10,000×10,000 pixels or more. It is impossible to use directly known and usual graphic workstations to render such textures on the terrain in reasonable time.

In the area of texture mapping, filtering techniques have been developed to adapt the pixel size used in object space to the pixel resolution of the projected pixels in the display space. A hierarchy of images is generated from the original texture using so-called MIPmap pyramid. This well known and widely used filtering method is described in L. Williams, "Pyramidal Parametrics", in Computer Graphics (SIGGRAPH 1983 proceedings), July 1983, pp. 1–11.

Further mapping textures under surfaces of computer generated objects with prefiltered MIPmap data leads by reducing the pixel size of the texture to an effect called aliasing, which aliasing gives to the viewer an impression of a blurred image on the display.

SUMMARY OF THE INVENTION

It is the object of the present inventions to enable computers disposing of a relatively low capacity for calculating the displayed image to fast and unaltered representations of images disposing of textures with a large size.

According to the present invention a picture is defined in an object space with a certain high resolution. The picture itself is described as a polygonal model of the structure of the picture and a number of textures filling the surface of the polygons. To each polygonal surface a texture is associated. The representation of a projection of the object space in the image space is calculated depending on a given viewers position and on a given viewers direction. The representation of the projection of the object space on the image space is displayed on a display. The display disposes of a defined resolution given by the amount of pixels in height and width of the display. The textures were represented by a multilevel parameter MIPmap. In order to determine the level of the MIPmap of a texture at which the texture has to be displayed on the screen a bounding box containing the considered polygon in object space is determined. Then a representation of the bounding box in the image space of the display is determined and the amount of pixels on the display covered in height and width by the bounding box in the image space of the display is determined. The maximum of the amount of pixel is determined and rounded up to a power of 2. The so determined power of 2 is the level at which MIPmaps of the texture of the considered polygon were useful representations of the picture on the display.

This allows to minimize the amount of data having to be stored in the memory used for the display without unduly limiting the resolution of the picture displayed. Further advantageous reduction of calculating time or storage memory required for displaying textures is described in the methods according to the claims 2 to 8 depending on claim 1.

In the independent claim 9 a method is claimed for determining the color of a pixel displayed on a display. Such method reduces a blurred image effect due to aliasing during mapping a texture and thereby reduces the resolution of the texture to a lower resolution.

When it is spoken of the color of a pixel it is both possible to consider color and black and white or gray scale pictures. Black and white is a representation wherein only two color values exist. A pixel is either black or white. A gray scale representation is a representation wherein the color values are only mixed out of black and white. True color representations were representations according to the pixel color values of fixed or variable bit length of three base colors. Other methods to define the color of a pixel on a display may also associate a color value to a pixel.

As a language convention the pixels representing an image in an object space not displayed on a display but stored in a memory are often designated with the term "texels" in order to differentiate them from screen pixels effectively displayed. According to claim 9 of the present invention is a method which determines, depending on the maximum amount of texels which may be considered for calculating, the color value of a pixel. The maximum amount of texels which may be considered depends on the limitation in the calculation speed of the processor used and other hardware or software limitations of the system used. The maximum number of color information the system is able to deal with is used to determine the color of a displayed pixel. The color value of a pixel is determined by calculating a weighted average of color values of an amount of texels. The amount of texels which has to be considered is determined by determining the so-called footprint of a pixel in the object space of texels, the footprint of a pixel being the amount of texels projected on one and the same pixel displayed. Then the aspect ratio of the bounding box of the footprint is determined by the length and width of the bounding box. The maximum value of the MIPmap level associated to the width of the bounding box and the length of the bounding box is determined using the aspect ratio of the bounding box and the maximum value of texels which may be considered. The integer value of that maximum is defining a MIPmap level. That so defined MIPmap level is used to build the weighted average of the texture.

The claims 10 to 14 describe further advantages developments of the method according to claim 9.

BRIEF DESCRIPTION OF THE DRAWINGS

Further the invention is described according to the FIGS. 1 to 9c. The figures show.

DETAILED DESCRIPTION OF THE PREFERRED EMBODIMENT

Figure 1:
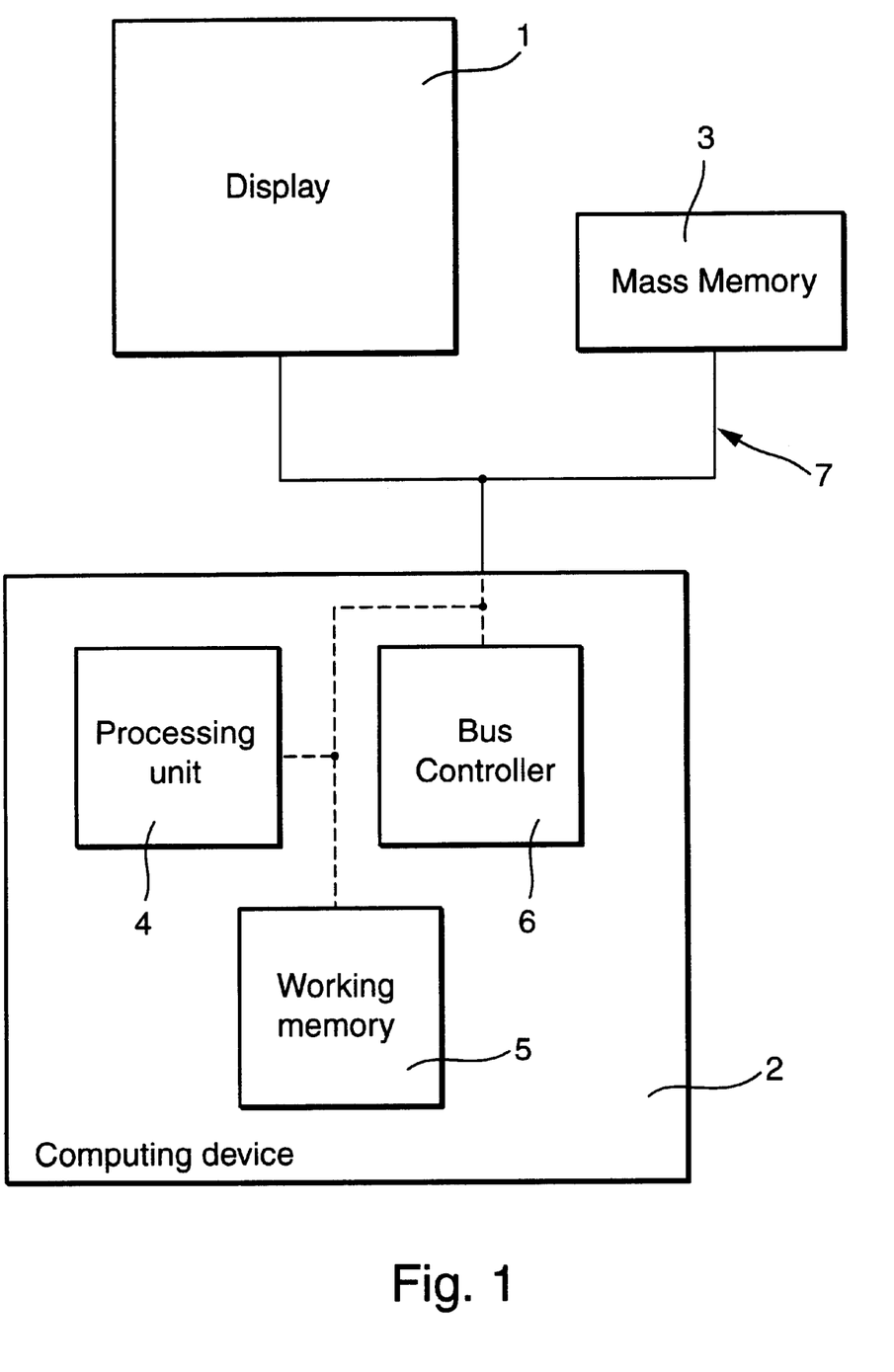
FIG. 1 device for displaying a picture.

FIG. 1 shows a schematic representation of the device required for the realization of the present invention. In the display 1 are displayed images determined by the computing device 2. The images displayed on the display 1, which may be a computer screen or a projector projecting digitalised images or a TV screen, are given in form of an array of points which are called pixels, each pixel having a determined position on the display and each pixel having a determined color value. The amount of pixels displayed on the screen in a line and a number of lines are a constructive characteristic of the display and is called the display resolution.

The computing device 2 is either a computer itself or a so-called graphic interface which is a part of a computer related with the central processing unit of the computer via a bus system 7 and which is used only for computing the images displayed on the screen. The computing device 2 comprises a processing unit 4 for calculating the image to display and a working memory 5 wherein both the images displayed and also data related and needed for computing them in the processing unit 4 are stored. Further the computing device is related to a mass memory 3, for example a CD-ROM player or a hard disk, which mass memory serves to store the representation or the image in a digitalised form.

Related to the present invention the mass memory 3 serves to store the MIPmaps generated for describing the textures filling the surfaces of the polygonal model and the polygonal model of the picture itself. In higher resolution graphics the amount of pixels representing a texture may be by a factor between 10 and 1,000 greater than the display resolution. This allows for example displaying pictures having a great sharpness on the display and it allows also to zoom in the picture without getting an obviously perceivable rasterized image on the screen.

It is also possible to store in the mass memory 3 the sets of vectors of weight for each possible footprint required for determining the weighted average over the color value of an amount of pixels.

In general the working memory will serve to store values related to the bounding boxes in object space and in image space, to serve as memory for all calculations executed by the processing units and to store one set of data representing the image displayed on the screen including one pixel with its associated color value for each pixel displayed on the screen which is determined by the screen resolution as described above.

The exchange of data between mass memory 3, display 1 and computing device 2 is made through a data bus 7. That data bus 7 is functionally controlled by a bus controller 6 which bus controller 6 of the data bus 7 may be part of the computing device as shown or may be an external bus controller.

Figure 2:
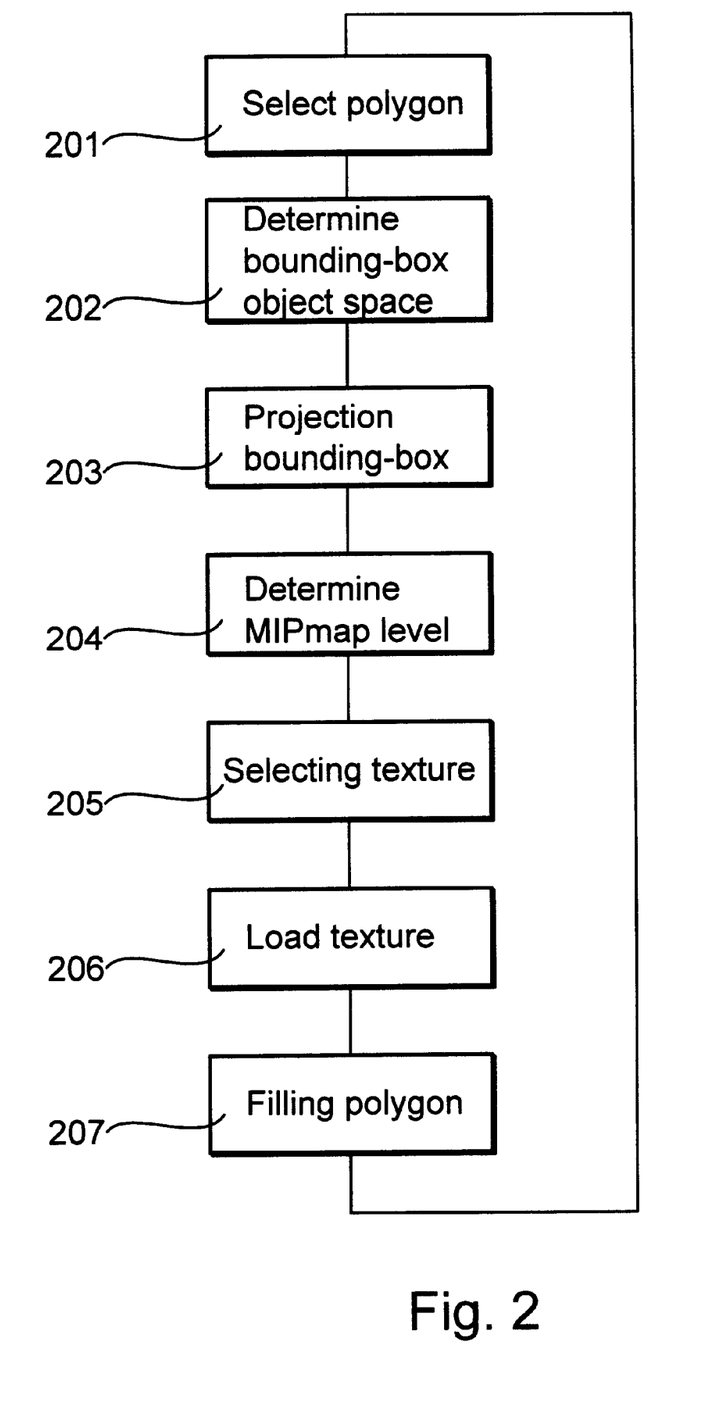
FIG. 2 method for selecting a MIPmap level L.

FIG. 2 shows a flow chart of the steps executed in order to display a polygon on the display and to determine the texture data to fill the polygon.

According to step 201 a polygon to be displayed is selected. According to step 202 a bounding box containing the polygon to be displayed is determined in the object space which is the MIPmap level of the highest resolution. Then the projection of a bounding box in an image space is determined in the step 203. This projection depends on the viewers position and the viewers direction of view which were given. When the projection from the surface of the bounding box in the image space on the display is known, it is determined how many pixels in height and width of the screen are covered by this bounding box. According to step 204 the MIPmap level at which MIPmaps of the texture of the considered polygon are used for the representation of the picture on the display are determined by determining the maximum of the height and width of the amount of pixels on the display covered by the bounding box and rounding up this maximum to the next power of two available. This power of two is the level of MIPmap used. According to step 205 the texture associated to the polygon is selected and then in step 206 the texture is loaded in the working memory from the mass memory. The texture in the description of the chosen MIPmap level is used when according to step 207 the image in the object space of the projection of the selected polygon is filled with the texture of the selected MIPmap level. These data are stored in the working memory and read out from the system for displaying the image on the display.

Figure 3:
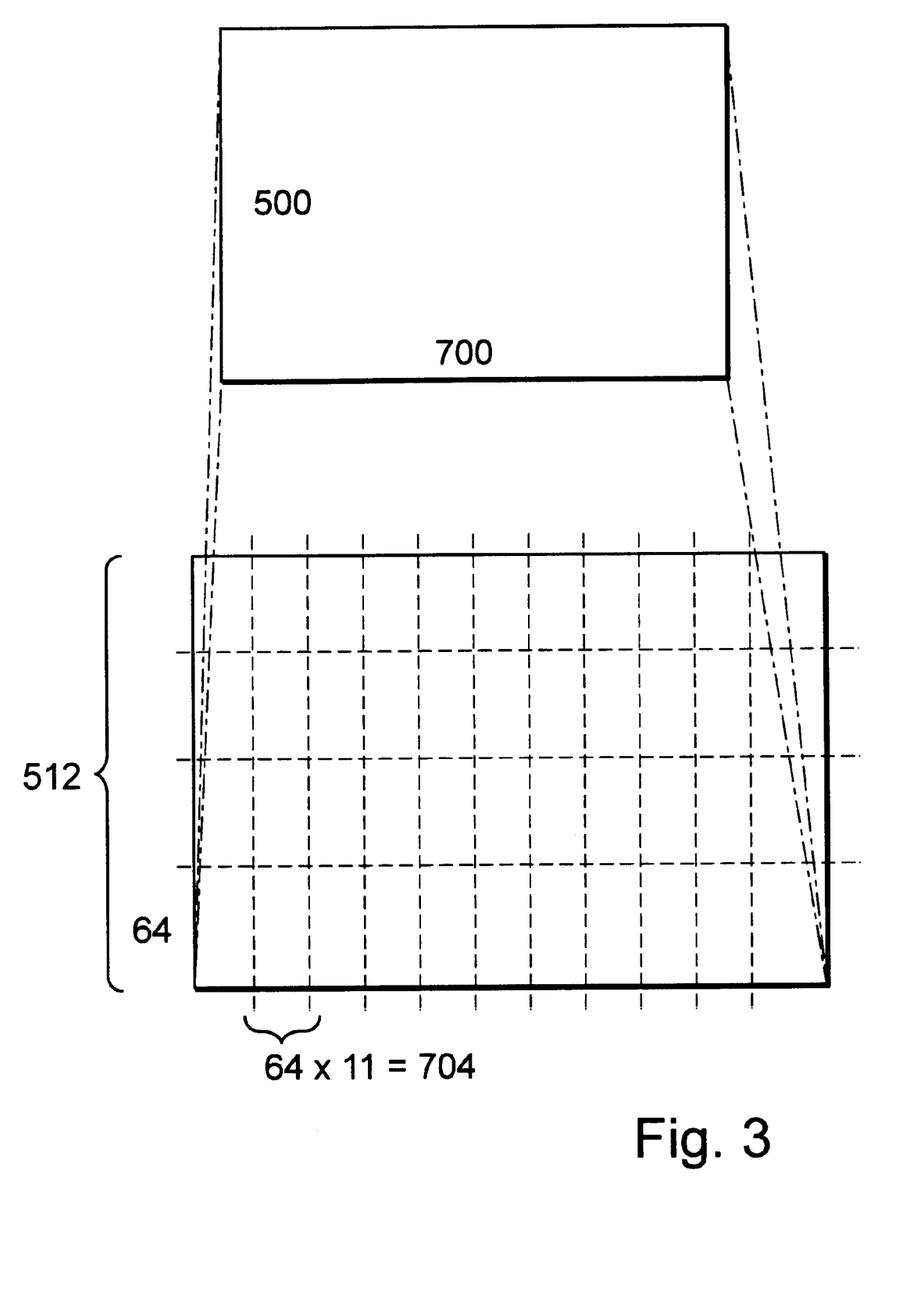
FIG. 3 method for dividing a texture in tiles.

FIG. 3 is a schematic example of a possibility to reduce the memory space required and the therefore mass memory needed for storing a texture in form of a MIPmap. In the example the texture requires a size of 500 pixels in height and 700 in width. The number of pixels above 500 being a power of 2 is 512. The number above 700 being an integer multitude of a power of 2 is 704 which is 11×64. So the texture of 500×700 pixels is projected on a space of 512×704 pixels whereby the associated to a pixel is determined by interpolation. That surface of 512×704 pixels is now divided into either 11 tiles of 64×512 pixels or in 44 square tiles of 64×64 pixels. For each of these square tiles a MIPmap representation is determined and then stored into the mass memory. A so generated set of MIPmaps is smaller than a single MIPmap calculated upon the previously use projection of the original image on 1,024×1,024 pixels, being the smallest square "tile" of a power of 2 greater than 500×700 pixels.

Figure 4:
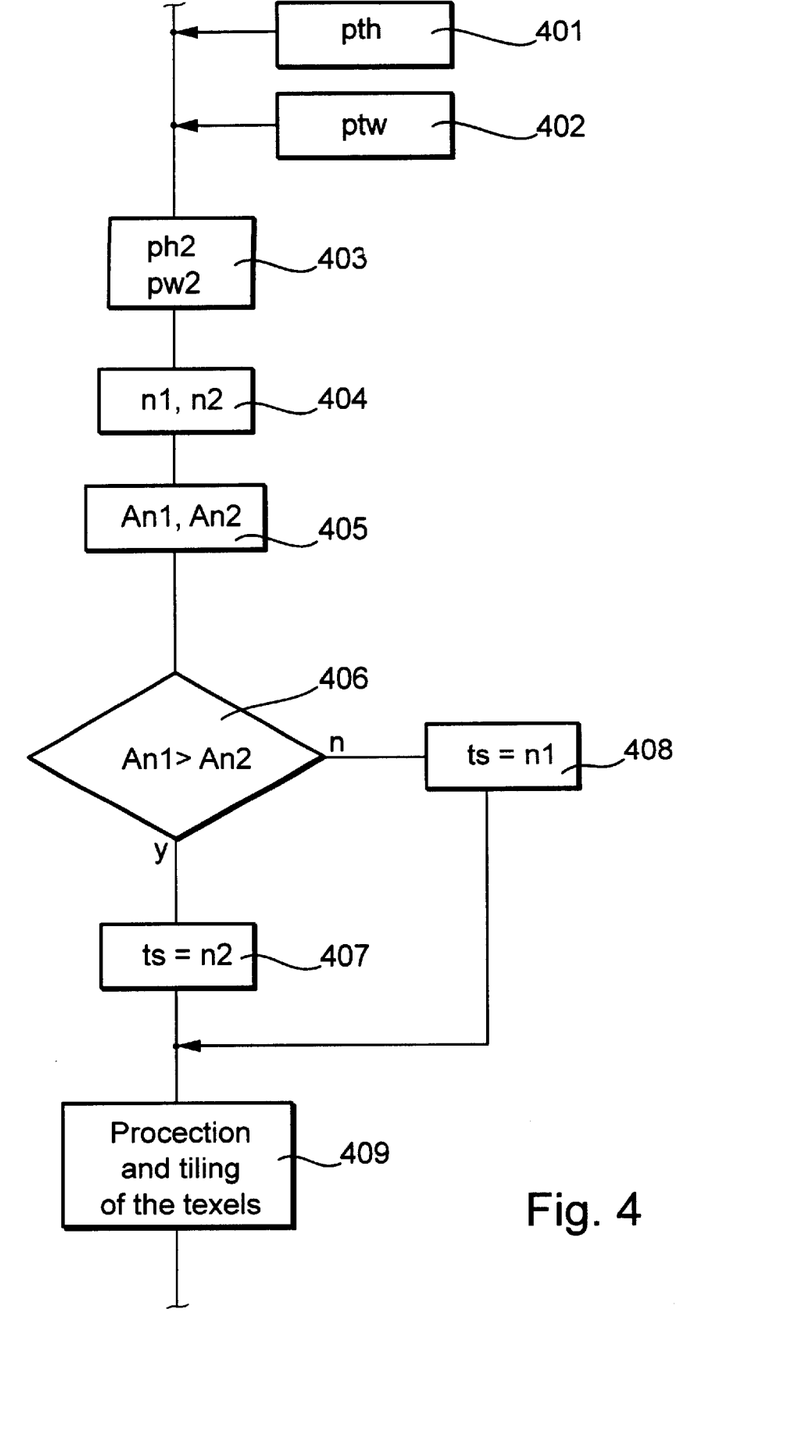
FIG. 4 method for determining the best tile size.

FIG. 4 shows the flow chart of a method for determining the biggest tile size possible that increases in a minimal way the texture size. First the pixel height pth and the pixel width ptw in the object space are determined for both the picture height and the picture width (steps 401, 402). The smallest number being an integer multiple of a power of 2 and being greater than the pixel height or picture width respectively is determined in step 403. The numbers are called ph2 and pw2 respectively. In step 404 for both ph2 and pw2 the biggest power of 2 being an integer divisor of ph2 and pw2 respectively is calculated and is called n1 and n2 respectively. If it is not required to dispose of square tiles then the tiles of a size of n1×n2 are MIPmapped and stored after having calculated the projection of the texture on a surface of tiles being greater than the surface of the texture.

Otherwise the surface areas An1, An2 of square tiles having a side length n1, n2 respectively are calculated in step 405. Then it is determined in step 406 whether the surface An1, An2 covered by tiles is greater than the texture surface and is completely covered by tiles of the side length n1 or in the other case n2. It is then determined which of these two surfaces is smaller. The smaller surface of the two surfaces is then used for projecting the texture on it and then divides the texture in a set of MIPmaps building a MIPmap for each tile, steps 407, 408 and 409.

Figure 5:
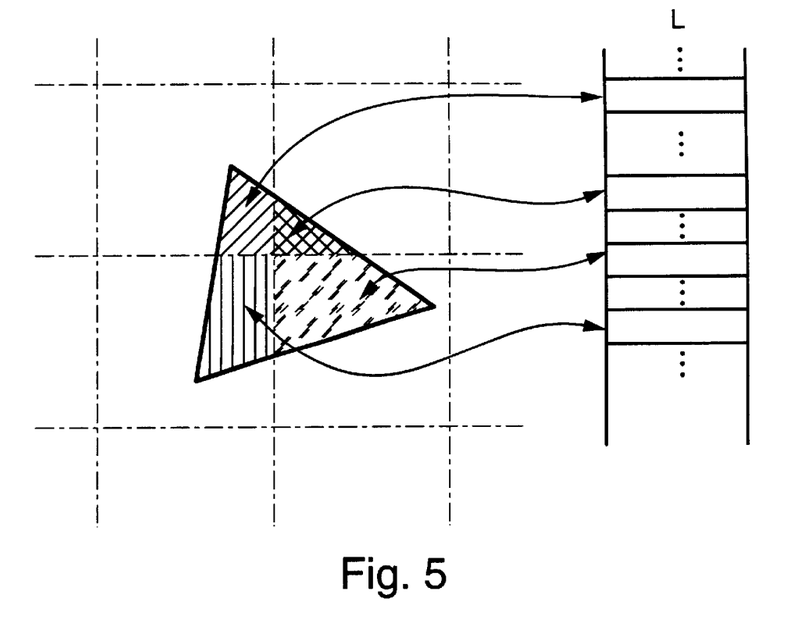
FIG. 5 method for generating a pointer list L referring to the pixels to be displayed.

FIG. 5 shows in a schematic manner a method how to determine which tile has to be used to fill the displayed polygon on the image surface. Therefore the polygon, in the present example a triangle, as displayed on the screen is laid over the tiles building the texture. Then a list L is generated wherein for each tile all the polygons covered by that tile are reported.

Figure 5A:
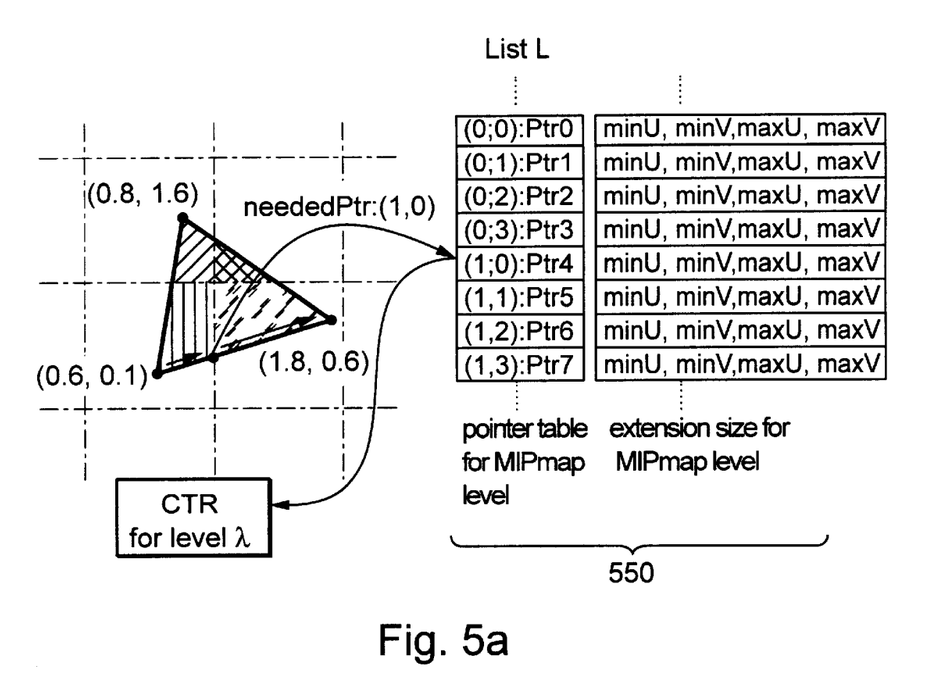
FIG. 5a method for generating an enhanced pointer table.

In order to improve the displaying of the textures for the list L according to FIG. 5a, the so-called current texture register (CTR) has to be integrated into the texturing unit, that holds for each level l of the MIPmap pyramid a pointer into a three dimensional pointer table 550. This table is addressed with the level denominator l referring to the corresponding MIPmap level and the two coordinates identifying uniquely the single pyramid of the tile of the texture. The texture coordinates are no longer in the range $[0 \ldots 1]^* [0 \ldots 1]$, they are now defined with a set of p*q pyramids in the range $[0 \ldots p]^* [0 \ldots q]$. The texture coordinates contain the information of crossing the border between two adjacent tiles during texturing. If such an event is detected by the logic interpolating the texture coordinates, the pointer to the now needed pyramid level is loaded into the current texture register (CTR) for the level l by using the truncated texture coordinates as indices into the table. If not only the pointer, but also an extension size is stored in the table 550, MIPmap levels of different MIPmap pyramids but the same level l can be merged together. The interpolation logic now loads the extension size into the comparators used for detecting the border crossing and uses this information for its decision when to change to another pointer.

In order to improve the color value of a pixel displayed the present method consists of filtering using a weighted average value on an amount of pixels which amount of pixel is chosen within a MIPmap. The number of texels that can be loaded for filtering in real time is restricted to a strict constant like memory band weights of bus weights. This limit is called M. That limit has to be respected because otherwise the system performance is decreased heavily. From the limit M is determined the MIPlevel l which is used to determine the weighted average. Therefore, the footprint in the object space of a pixel displayed in the image space is determined. This footprint has a bounding box in texture coordinates with the extension (u, v). The intention is to load a rectangle of a*b texels from the MIPmap level l to cover the footprint and to respect at the same time the limit M. Therefore the aspect ratio f=u:v of the bounding box is determined. From the equations M=(a*b) and f=(a:b) follows a=(M*f) and b=(M:f). These values can be used to calculate two MIPmap levels m and n.

The MIPmap level then chosen is the maximum of the values from m and n:l=maximum (m, n). That is the MIPmap level l that has to be accessed to get the maximum amount of texture information to cover the footprint and to respect M. To do a correct filtering the contributions of the single texel values to the final pixel value have to be calculated. This is done with a precalculated lookup table taking in account all possible configurations of footprints, since calculating this on the fly would generally be too expensive.

The point at which the bounding box touches the footprint is a quadrilateral. The corners of the quadrilateral lie on the bounding box. The corners were shifted to integer coordinate values assuring the footprint covers at least one texel. The contribution of a texel to the footprint is now a fixed value. It is possible to compute for each possible footprint a vector consisting of M weights which represents the footprints coverage for each texel. Computing the weights is a preprocessing step and once it is done the result is stored in a lookup table. With the help of these weights, a filtering can be performed, since they represent the coverage of the footprint. It is possible to store the texels fetched from memory in a linear array T and the weighting vectors in a weight table W. The filtered pixel value is then the vector product of the linear array T and the weighting table W.

Figure 6:
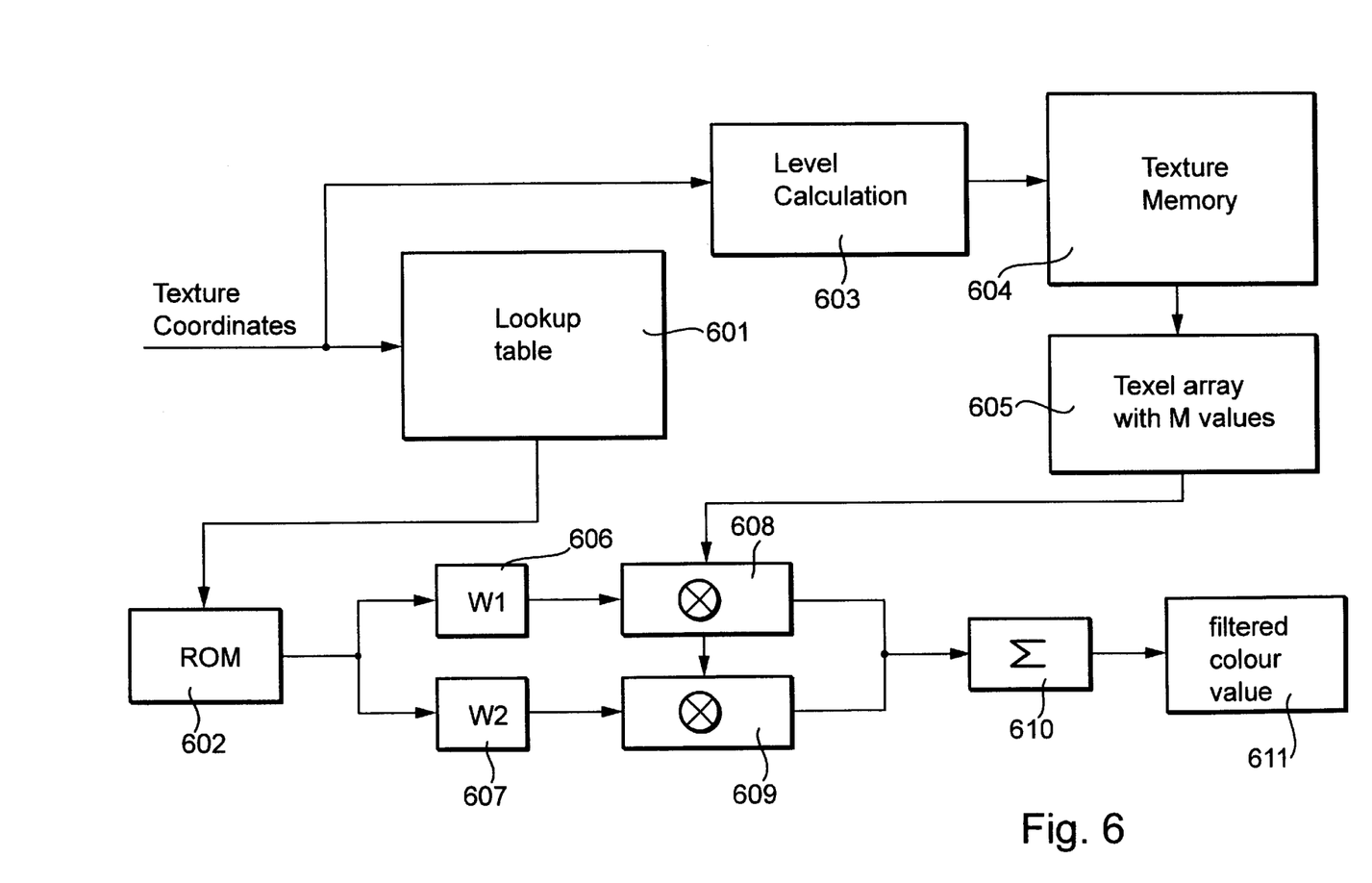
FIG. 6 method for determining the color value of a pixel.

FIG. 6 shows a schematic representation of a method according to claim 9. The texture coordinates in texels were generated and then fitted to the system. The lookup table containing the weight vector is calculated according to step 601 and stored in the Read Only Memory 602. The read only memory is part of the mass memory, in general a CD-ROM. While displaying the image according to step 603, the determination of the usable MIPmap level l takes place. According to step 604 from the mass memory containing the texture the texture MIPmap of the level l is loaded. And in step 605 the array of texels being displayed is created. Meanwhile the wait tables w1 and w2 are read out of the CD-ROM with the values calculated in the lookup table according to steps 606 and 607. In the present representation there are two sets of weight vectors (w1, w2) loaded, because the rectangle shape of the footprint is divided into two triangles. Dividing the rectangular shape of the MIPmap in triangles reduces the number of weighting vectors needed but introduces the necessity to calculate two vector products in the steps 608 and 609. The vector products of the vector w1 respective w2 with the texel array determined in step 605 is determined in the steps 608 respective 609. The total color value of a pixel displayed is built by determining the sum of the two products calculated in the previous steps according to step 610. The so obtained filtered color value 611 may be stored in the working memory in order to serve for displaying the pixel on the screen.

Figure 7:
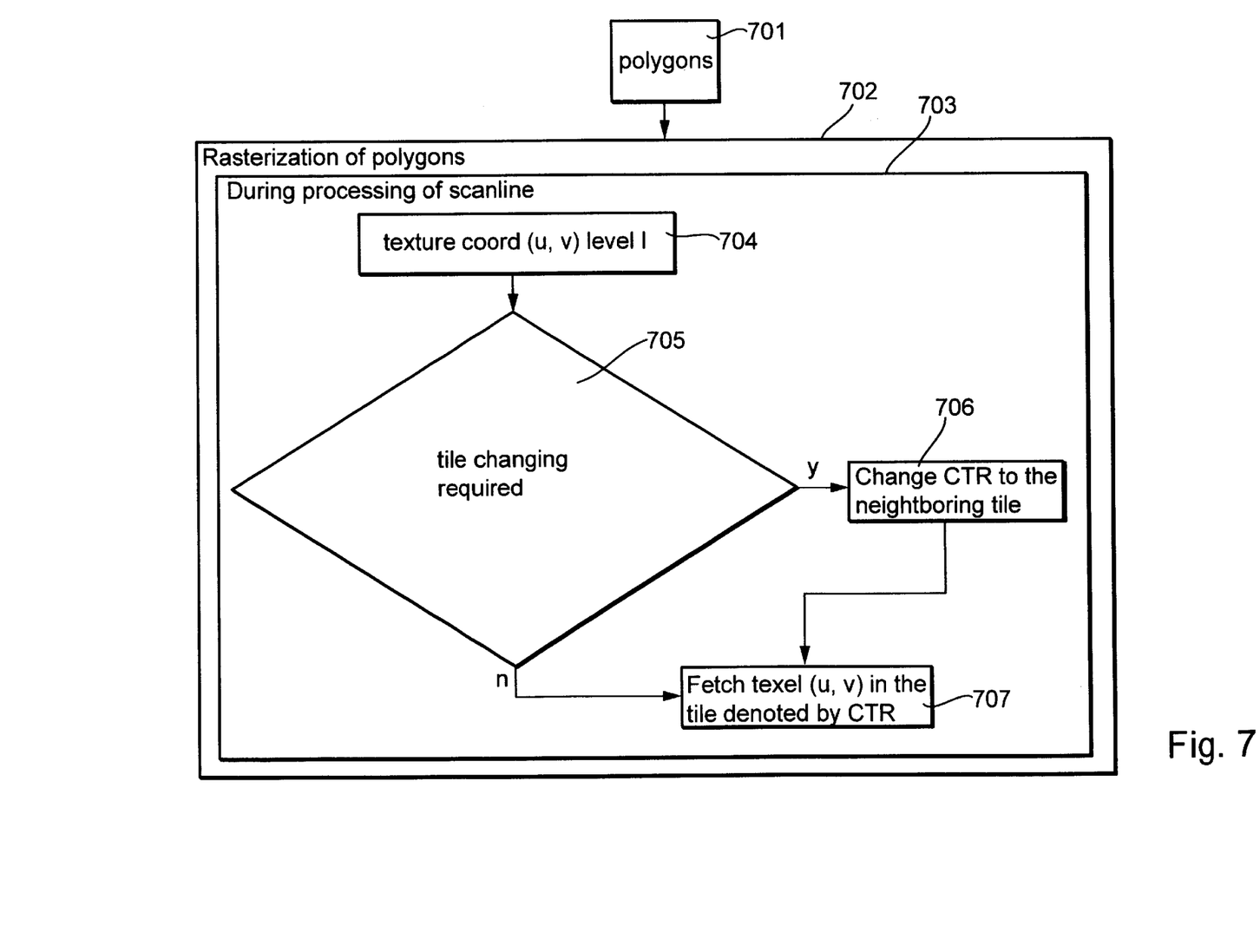
FIG. 7 method for selecting a pixel out of several tiles.

FIG. 7 shows how it is possible to have a fast access to the pixel values of a texture divided into several tiles. For a polygon represented in box 701 is built a rasterization of a texture according to box 702. For displaying the image composed of polygons with their texture respectively list L of textures contained in the line (FIG. 5) is built. For addressing the texture in a three dimensional table the stored pointers (CTR, u, v) accessing to the corresponding pixels were generated according to box 704. While proceeding the filling of a polygon with a tiled texture is determined according to box 705 if it is required to change between two tiles for displaying the next pixel. If that is the case according to step 706 only the counter referring to the neighboring tile CTR has to be changed in the addressing table. And according to step 707 the texel is fetched with the coordinates (u, v) in the tile denoted by the counter CTR. If no tile-changing is required according to tile 705, step 707 is proceeded directly. So the three dimensional coordinate table containing texture coordinates (u, v) the level l of the MIPmap were simply added to a coordinate representing the tile counter CTR to build up the three dimensional pointer table. As this three dimensional pointer table has only to be calculated once it allows a fast access to the pixel data required to be displayed (see FIG. 5*a*).

Figure 8:
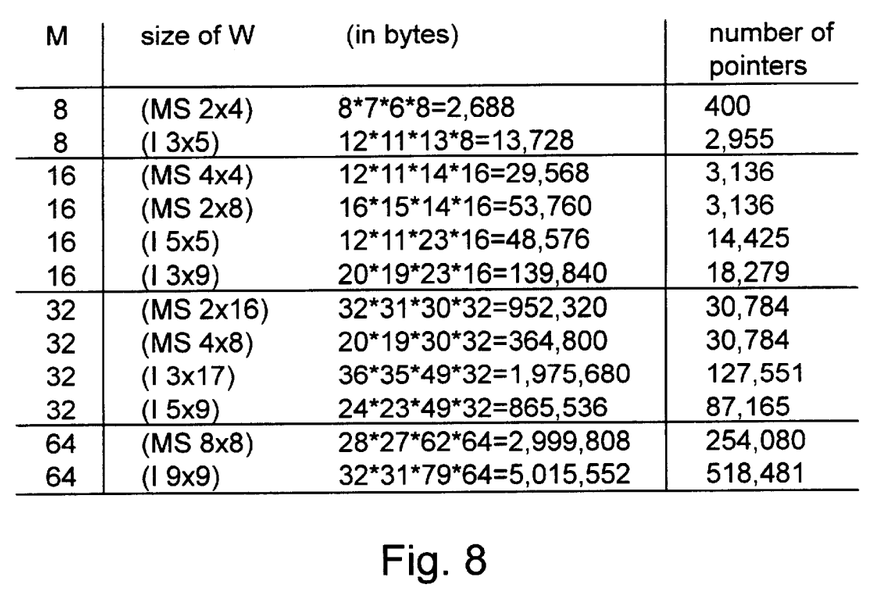
FIG. 8 size of lookup-tables.

FIG. 8 shows the number of pointers and weights having to be considered depending on a number of different values of M whereby in column 2 the abbreviation "S" has to be applied when a so-called mid-point snapping has to be executed before using the integer values of the footprint coordinates in order to ensure that the surface of the footprint has a value different from zero. The abbreviation "I" represents the case if the coordinates of the corner points of the footprints dispose of integer values.

Figure 9A:
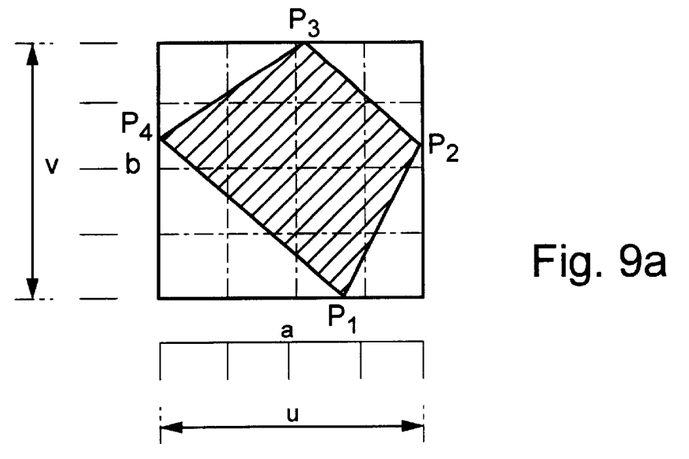
FIGS. 9a–9c footprint generation and weight factor for a pixel color value.
Figure 9B:
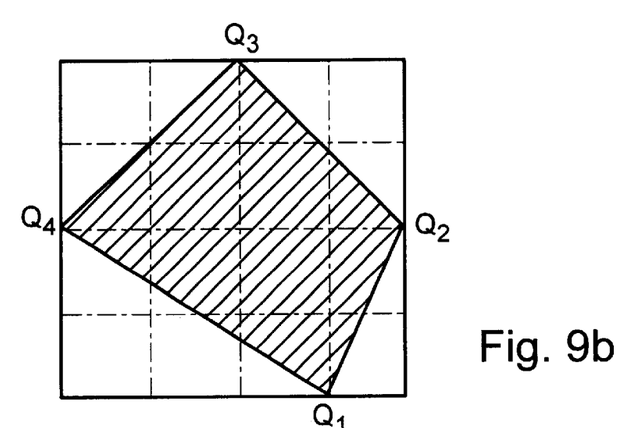
Figure 9C:
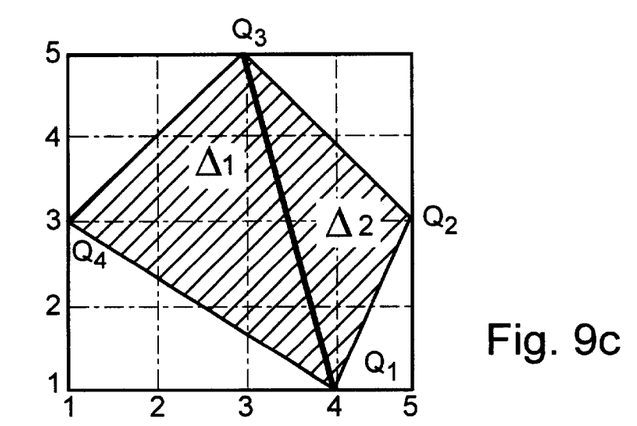

FIGS. 9*a* to 9*c* represent the footprint of a pixel in the texel space (the object space) whereby FIG. 9*a* shows the projection of the footprint of the real coordinate values of the intersection of the footprint with the bounding box of the footprint. FIG. 9*b* shows the footprint with the corner points transferred to integer positions and FIG. 9*c* represents a footprint divided into two triangles in order to reduce the number of weights having to be considered during the determination of the stored lookup table.

I claim:

1. A method for determining the representation of a picture on a display, a) said display
having a display resolution defined by the amount of pixels in the height and width of the display and defining with its resolution the image space of the picture;

b) said picture being defined in an object space with a resolution greater than the display resolution, by a polygonal model and a number of textures,
wherein a texture is associated with each polygonal surface;

c) each texture being represented by multi-level pyramidal MIPmap, such MIPmap being composed of levels 11, ..., li, ..., 1x, wherein
each level li contains a representation of the texture with a resolution of $2^l$ pixels and the level 1x represents the maximum resolution available for the MIPmap considered;

d) the representation of a projection of the object space in the image space is calculated depending upon a given viewers position and upon a given viewers direction; wherein the level at which a texture is displayed within a polygon is determined by the following steps:

e) determining a bounding-box containing the considered polygon in the object space;

f) determining the representation of the bounding-box in the image space of the display;

g) determining the amount of pixels of the display covered both in height and width by the bounding box;

h) rounding up the maximum number of the pixels in height and width to a power of two;

i) the so determined power of two being the level at which MIPmaps of the texture of the considered polygon were used for the representation of the picture on the display; wherein the MIPmap representation of a texture is determined by:

j) dividing the texture in tiles having a side length in pixels in the object space, which is a power of two, and covering at least the surface of the texture;

k) determining the biggest tile size possible that increases the texture size in a minimal way;

l) calculating the projection of the texture on the surface covered by the tiles and m) calculating a MIPmap-pyramid for each tile using the projection of the texture on the tile, the side length of the tile defining the MIPmap-level with the maximum amount of pixels
characterized in that the biggest tile size possible that increases in a minimal way the texture size is determined through the following steps:

n) determining the pixel height pth and the pixel width ptw in the object space, o) determining for the pixel height pth in the object space the smallest number ph2 greater than the pixel height, that is an integer multiple of a power of two and determining the biggest power of two ph2m that is an integer divisor of that smallest number ph2;

p) determining for the pixel width in the object space the smallest number pw2 greater than the pixel width, that is an integer multiple of a power of two and determining the biggest power of two pw2m that is an integer divisor of that smallest number pw2;

q) determining a first tiling surface as the surface of an array of tiles with the side length ph2m covering at least the surface of the texture;

r) determining a second tiling surface as the surface of an array of tiles with the side length pw2m covering at least the surface of the texture;

s) using tiles of the side length ph2m as biggest tile size when the first tiling surface is smaller than the second tiling surface;

t) using tiles of the side length pw2m as biggest tile size when the second tiling surface is smaller than the first tiling surface.

2. The method according to claim 1, characterized in that before displaying a polygon on the display with its texture, a texture object containing the MIPmaps of all tiles at the level of the determined power of two used for the representation of the texture on the display is loaded in a memory, for each polygon displayed it is determined which tiles are covered by the polygon, thereby establishing a list L which holds for each tile all the covering polygons, then the polygon is displayed.

3. The method according to claim 2, characterized in that the determination of the tiles covered by the polygon displayed is made using a rasterization algorithm.

4. The method according to claim 3, characterized in that the rasterization algorithm is a Pineda rasterization algorithm.

5. The method according to claim 2, characterized in that a texturing unit contains a current texture register (CTR) that holds a pointer into a two dimensional pointer table for each level of the MIPmap-pyramid of a tile, the table being addressed by a level denominator l and two truncated texture coordinates which are indices identifying uniquely the MIPmap-pyramid of a tile, wherein when the border between two adjacent tiles is crossed while displaying the texture on the screen the pointer to the now needed tile is loaded in the current texture register using the truncated texture coordinates as indices into the table.

6. The method according to claim 5, characterized in that changing to a neighboring tile is detected by evaluating a tile extension in a texture space that is also stored in the table.

7. A method for determining the color of a pixel displayed on a display, wherein the color of the pixel is represented by a color value;

an original picture is represented by a set of texels stored in a MIPmap, each texel comprising an associated color value, and with an amount of texels at least equal to the amount of pixels;

a representation of the image texels on the screen pixels is determined, said representation associating each pixel of the screen with at least one texel;

the texels being stored in form of a MIP-map, wherein the color value of the pixel is an average value over the color value of a multitude of texels characterized in that the maximum value M of texel which may be considered for calculating the color value of the pixel is given;

the footprint of the pixels is determined by the texels associated to the pixel;

a bounding box of the footprint is determined; an aspect ratio S of the bounding box is determined by dividing a length and a width of the bounding box;

a first MIPmap-level L1 associated with the length of the bounding box is determined using the aspect ratio S and the maximum value M;

a second MIPmap-value level L2 associated with the width of the bounding box is determined using the aspect ratio S and the maximum value M;

the integer value of the maximum of the first and second MIPmap-value is taken as a usable MIPmap-level L and a weighted average of the texels of MIPmap level L associated with the pixel is taken as the color value of the pixel.

8. The method according to claim 7, characterized in that the weighted average is calculated using a predetermined lookup table.

9. The method according to claim 8, characterized in that for each possible footprint a vector W of M weights which represents the footprint's coverage for each texel is preprocessed and stored in a lookup-table.

10. The method according to claim 9, characterized in that the weighted average is calculated by determining the sum of the product of the texels color value Ti multiplied with the associated vector Wi of weights over all texels considered.

11. The method according to claim 10, characterized in that the footprint is divided in two triangular parts, whereby for each texel a vector of weights W1 for the first triangle and a vector of weights W2 for the second triangle were determined and the weight of a texel for building the average is the sum of the vector weights W1 and W2.

* * * * *